United States Patent
Patel et al.

(12)

(10) Patent No.: US 11,182,354 B1
(45) Date of Patent: Nov. 23, 2021

(54) DATA ANALYSIS AND PROCESSING ENGINE

(71) Applicant: Tekion Corp, San Ramon, CA (US)

(72) Inventors: Jagdish Mohanlal Patel, Fremont, CA (US); Sasidhar Janne, Chittoor (IN)

(73) Assignee: Tekion Corp, Pleasanton, CA (US)

( * ) Notice: Subject to any disclaimer, the term of this patent is extended or adjusted under 35 U.S.C. 154(b) by 210 days.

(21) Appl. No.: 16/693,037

(22) Filed: Nov. 22, 2019

Related U.S. Application Data (60) Provisional application No. 62/771,753, filed on Nov. 27, 2018.

(51) Int. Cl.
*G06F 7/00* (2006.01)
*G06F 16/21* (2019.01)
*G06F 16/28* (2019.01)
*G06F 16/901* (2019.01)
*G06F 16/11* (2019.01)
*G06F 16/2455* (2019.01)

(52) U.S. Cl.
CPC .......... *G06F 16/211* (2019.01); *G06F 16/116* (2019.01); *G06F 16/24564* (2019.01); *G06F 16/283* (2019.01); *G06F 16/901* (2019.01)

(58) Field of Classification Search
CPC ..... G06F 16/901; G06F 16/283; G06F 16/116
USPC .......................... 707/736, 803, 807, 999.203
See application file for complete search history.

(56) References Cited

U.S. PATENT DOCUMENTS

| | | | |
|---|---|---|---|
| 6,715,128 B1 * | 3/2004 | Hirashima | G06F 16/212 715/209 |
| 10,909,091 B1 * | 2/2021 | Shah | G06F 16/2379 |

* cited by examiner

*Primary Examiner* — Md I Uddin
(74) *Attorney, Agent, or Firm* — Fenwick & West LLP (57) ABSTRACT

A system formats and normalizes data stored in received files. A data processing engine identifies a filetype and format of the file based on samples of the file contents. The system detects a schema of the file to determine the datatypes and locations of data within the file. The schema detection process may depend on the identified filetype of the file. Once a filetype and schema have been determined, the system can reformat data stored within different sections of the file in view of the datatypes. The formatted file is stored in a data lake with other files received by the system. The formatting process can involve normalization of certain datatypes, which facilitates access of the data later by a user querying the data stored in files at the data lake.

17 Claims, 7 Drawing Sheets

```
┌─────────────────────────────────────────┐
│   Identify a filetype of a received file.│
│                   425                   │
└─────────────────────────────────────────┘
                    │
                    ▼
┌─────────────────────────────────────────┐
│ Based on the identified filetype, detect a schema of the file. │
│                   430                   │
└─────────────────────────────────────────┘
                    │
                    ▼
┌─────────────────────────────────────────┐
│ Access a set of normalization rules applicable to the file. │
│                   435                   │
└─────────────────────────────────────────┘
                    │
                    ▼
┌─────────────────────────────────────────┐
│ Using the detected schema, identify data fields within the │
│ file that may be affected by the set of normalization rules. │
│                   440                   │
└─────────────────────────────────────────┘
                    │
                    ▼
┌─────────────────────────────────────────┐
│ Normalize the data entries at the identified data fields of │
│ the file based on the normalization rules. │
│                   445                   │
└─────────────────────────────────────────┘
```

DATA ANALYSIS AND PROCESSING ENGINE

CROSS REFERENCE TO RELATED APPLICATIONS

This application claims the benefit of U.S. Provisional Application No. 62/771,753, filed Nov. 27, 2018, which is incorporated by reference herein in its entirety.

BACKGROUND

Field of Art

This disclosure relates generally to data format normalization and more particularly to schema identification for formatting data stored in a data lake.

Description of Art

Data storage and retrieval systems can store many files. A system receives files of many different filetypes for storage. Among files having the same filetype, the formatting, datatypes, and file schemas may vary from one file to the next. The variety of filetypes, and file schemas makes it difficult to efficiently access and search for data stored within a large collection of files. To enable searches within such a collection of files, the filetypes and schemas of the individual files often must be manually identified. Furthermore, files may store data of the same datatype in differing formats, which can cause difficulties in searching for the same datatype within a file or across multiple files.

SUMMARY

A system automates a process of file ingestion, filetype identification, and schema detection. The system receives incoming files for storage. The received files may have varying file formats and schemas. The system uses a data processing engine to automatically identify filetypes and schemas of the received files and to format the data in the files such that the files can be stored using a commonly queryable format in a data lake associated with the system.

When the data processing engine receives a file, it first identifies the file format. That is, the data processing engine applies a model, such as a predetermined rule set, to a sample of the data in the file to determine the filetype of the file. The data processing engine then detects a file schema. A model or rule set that is used to detect the file schema is selected based on the detected filetype of the file. The schema detection determines the structure of the file as well as the datatypes of the data stored in the file.

Once a schema has been determined for a file, the data processing engine normalizes the format of the data stored within the file. The normalization may standardize the datatypes of a file according to pre-determined normalization rules such that a file stored by the system stores data of particular types in the same format. The system stores the formatted file in a data lake. A data lake is a system or repository of data stored in its natural format (i.e., raw format such as object blobs or files). Due to the data normalization and preprocessing prior to storage, the data in the files can be searched and accessed by a user of the system.

The features and advantages described in this summary and the following detailed description are not limiting and not all-inclusive. Many additional features and advantages will be apparent to one of ordinary skill in the art in view of the drawings, specification, and claims hereof.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
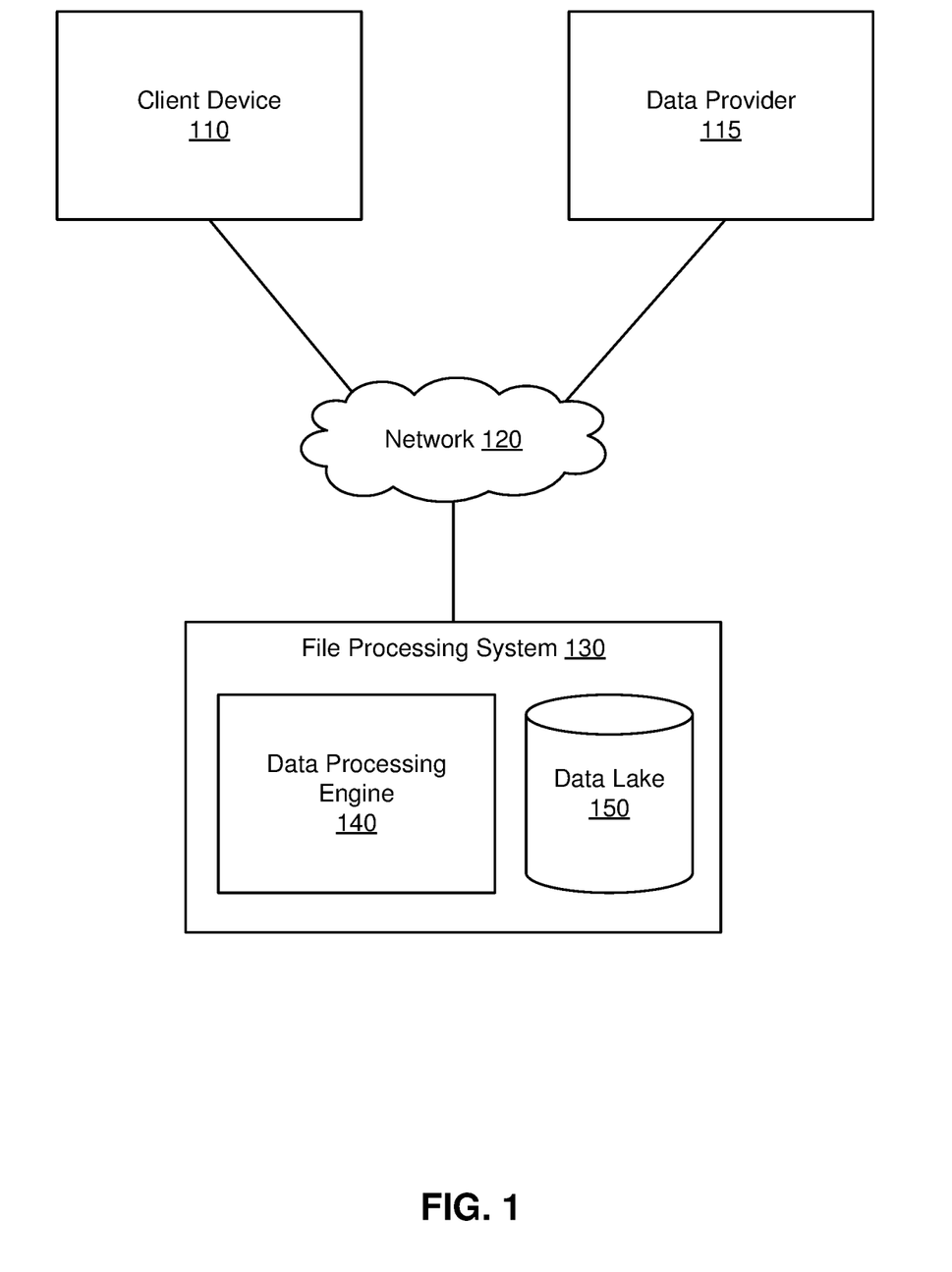
FIG. 1 is a high-level block diagram of a system environment for a file processing system that stores files of various filetypes, in accordance with an example embodiment.

FIG. 1 is a high-level block diagram of a system environment for a file processing system 130 that stores files of various filetypes, in accordance with an example embodiment. FIG. 1 includes a client device 110, a data provider 115, a network 120, and the file processing system 130. For clarity, only a single client device 110 and a single data provider 115 are shown in FIG. 1. However, various embodiments of the system environment can have any number of client devices 110 and any number of data providers 115. The functions performed by the various entities of FIG. 1 may vary in different embodiments.

The file processing system 130 receives files from data provider 115. The received files may be of different file types. In one embodiment, the file processing system 130 receives, processes, and stores the files of different filetypes such that at least some of the data included in the files have a normalized data format. The file processing system 130 comprises a data processing engine 140 and a data lake 150. Computer components such as web servers, network interfaces, security functions, load balancers, failover servers, management and network operations consoles, and the like are not shown so as to not obscure the details of the system architecture.

Files received by the file processing system 130 may be routed through the data processing engine 140 prior to storage in the data lake 150. The data processing engine 140 determines the filetype of an incoming file. Based on the determined filetype, the data processing engine 140 further analyzes the file to detect the schema of the file. In one embodiment, the schema of a file describes the organization of data within the file. A schema may specify sections (i.e., fields, columns, etc.) of the file that store different datatypes. For example, a schema may describe how many columns are stored in a database table and may further describe the datatype of data stored in each column. Using the detected schema of the file, the data processing engine 140 can format, aggregate, and normalize the data stored within the file. Reformatting the data into a common queryable format makes it possible for users accessing the data stored in the data lake 150 to query the data in the same way irrespective of which file source the data is coming from or the original format of the data. After a file has been processed by the data processing engine 140, the file processing system 130 stores the reformatted version of the file in the data lake 150. The data lake 150 is a system or repository of data stored in its natural format (i.e., raw format as object blobs or files).

A user, organization, or other system may provide files to the file processing system 130 through a data provider 115. A data provider 115 can be any computing device capable of interacting with the file processing system 130 such as personal or mobile computing devices and enterprise computing devices including, smartphones, tablets, and server systems.

A user, organization, or other system may request information from the file processing system 130 through a client device 110. A request for information may include a query of the data lake 150. For example, a client device 110 may send a Structured Query Language (SQL) query to the file processing system 130 to request information stored in a file within the data lake 150. A client device 110 can be any computing device capable of interacting with the file processing system 130 such as personal or mobile computing devices and enterprise computing devices including, smartphones, tablets, and server systems. In some embodiments, a client device 110 and a data provider 115 may be the same system. For example, a system may act as a data provider 115 to send files to the file processing system 130 for storage, and the same system may act as a client device 110 to request information from the file processing system 130.

The client devices 110 and the data providers 115 can communicate with the file processing system 130 via the network 120, which may comprise any combination of local area and wide area networks employing wired or wireless communication links. In some embodiments, all or some of the communication on the network 120 may be encrypted.

Figure 2:
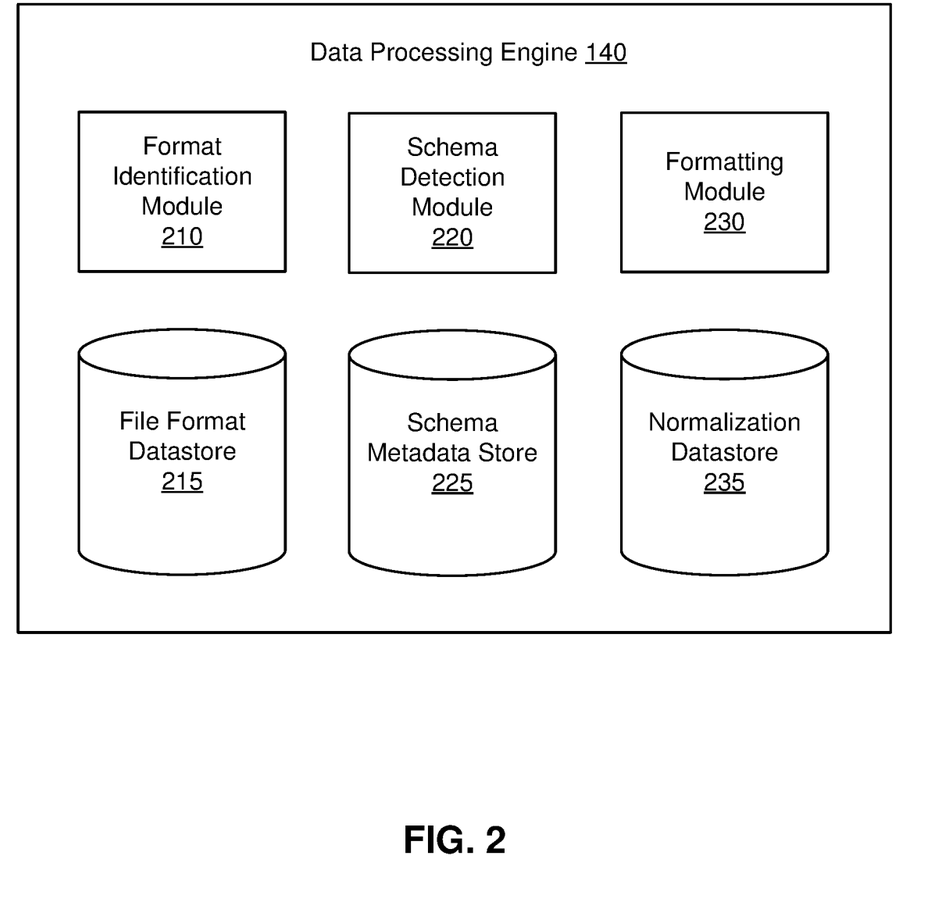
FIG. 2 is a high-level block diagram of a system architecture for the data processing engine, in accordance with an example embodiment.

FIG. 2 is a high-level block diagram of a system architecture for the data processing engine 140, in accordance with an example embodiment. The data processing engine 140 includes various modules and data stores to analyze and reformat files. The data processing engine 140 comprises a format identification module 210, a file format datastore 215, a schema detection module 220, a schema metadata store 225, a formatting module 230, and a normalization datastore 235. In various embodiments, the data processing engine 140 may contain more, fewer, or different components than those shown in FIG. 2 and the functionality of the components as described herein may be distributed differently from the description herein.

The format identification module 210 identifies the filetype of an incoming file received from a data provider 115. An incoming file may be any format including, for example, comma separated value (CSV), JavaScript Object Notation (JSON), and extensible markup language (XML). To identify the filetype of a file, the format identification module 210 samples the data from the file and applies a computer model, such as a ruleset to the data to determine the likely format of the file based on the sampled data.

The file format datastore 215 stores the computer models that are used by the format identification module 210 to identify the format (i.e., filetype) of a file. In one embodiment, the computer models stored at the file format datastore 215 comprise rulesets for testing data sampled from a received file. The file format datastore 215 may include a rule set for XML files, a ruleset for CSV files, and a rule set for JSON files for example. In one embodiment, each ruleset corresponds to a particular file format and describes one or more indicators that are associated with the file format. The format identification module 210 searches a file for the indicators of each ruleset and determines that a file is of a particular file format responsive to identifying an indicator(s) from one of the rulesets in the file.

For example, to determine whether the file is an XML file, the format identification module 210 uses an XML ruleset that includes instructions to perform a pattern match on the file sample to check if the file starts with a '<' symbol (e.g., an indicator), and whether the file contains many '<' and '>' symbols and if it contains other symbols that are associated with an XML file. If the file is not determined to be an XML file, then the ruleset may include further instructions to perform a pattern match on the file sample to determine whether the file is a JSON file. To determine if the file is a JSON file, the ruleset may instruct the format identification module 210 to determine whether the file starts with a '{' symbol (e.g., an indicator) and to find patterns of the '{' and '}' symbols. If the pattern of data from the file sample matches the JSON patterns of the ruleset, then the format identification module 210 determines that the file has a JSON filetype. If the file is not determined to be a JSON file, the ruleset may instruct the format identification module 210 to determine whether the file is a CSV file. To detect a CSV filetype, the ruleset may include instructions for the format identification module 210 to split each line of the file by commas or pipe symbols and to count the resulting columns of each line in the file after the split. If the counts match for each line, then the format identification module 210 may determine that the file has a CSV filetype. In various embodiments, the ruleset or model stored in the file format datastore 215 may be different and may be able to identify other filetypes besides those described in the example.

The schema detection module 220 detects (i.e., determines) a schema of a received file. A file schema is a specification of the format and datatypes of contents within a file. That is, the schema describes the file structure of the file. For example, a file schema may describe a number of data columns stored in a file and the datatypes of data entries associated with each column. The particular information described by a schema varies depending on the filetype of a file. For example, a schema for a CSV file may specify a number of columns in the file and the datatypes stored in each of the columns. A schema for a JSON file, for example, may identify a number and order of JSON objects in the file, and may further describe the datatype of data stored at each JSON object. A schema for an XML file, for example, may identify a number and order of elements and attributes that appear in the XML file, as well as datatypes associated with each of the elements and attributes in the file. Examples of datatypes that may be stored in a file include integers, strings, Booleans, dates, times, characters, and floating point numbers.

The schema metadata store 225 stores schemas for files of various filetypes. In some embodiments, the schema metadata store 225 also stores instructions for the schema detection module 220 to use to determine whether a given file conforms to a known schema and instructions for the schema detection module 220 to use to generate or update a schema for a filetype. The schema metadata store 225 stores schemas for different filetype categories. In one embodiment, when a new filetype is received by the data processing engine 140, the schema detection module 220 will generate a new schema to associate with the new filetype category, and will store the new schema in the schema metadata store 225 in association with the new filetype category.

To determine the schema of a file, the schema detection module 220 may parse the contents of the file in view of the identified filetype of the file. The schema detection module 220 may parse the files differently depending on the identified filetypes. In one embodiment, the schema detection module 220 determines whether any schemas for the identified filetype are stored in the schema metadata store 225. If the schema metadata store 225 has one or more schemas for the identified filetype category, the schema detection module 220 may compare the contents of the file (or a sample of the contents of the file) to the one or more stored schemas. If the file contents match a schema stored for the filetype category, the schema detection module 220 may determine that the matching schema applies to the file.

If no schemas are stored at the schema metadata store 225 for the identified filetype category, or if the file does not match any schemas that are stored in the schema metadata store 225 for the filetype category, the schema detection module 220 may generate a schema for the file by parsing the file. In one embodiment, the schema detection module 220 includes instructions or rulesets for parsing files of varying filetypes and detecting the layout and datatypes stored within the file. In some situations, the schema detection module 220 may detect that a schema stored in the schema metadata store 225 is the correct schema to associate with the file, but that some changes have been made to the schema for that filetype. The schema detection module 220 generates a new version of the schema for the filetype accordingly. In those cases that the schema detection module 220 generates a new or updated schema for a filetype, the schema is stored in the schema metadata store 225 in association with the filetype.

Certain datatypes can be more difficult to detect within a file, in particular those datatypes that can be expressed in different formats. The schema detection module 220 may perform additional analysis to determine whether these datatypes are present in a file when generating or checking a file schema. One example of a datatype that can be difficult to detect is a date given a date can be stored in different formats such as different combinations of integers and strings. As an example, the same date may be stored in different files as "Oct. 31, 2019", Ser. No. 10/312,019, "10-31-2019", "2019/10/31".

To detect a date datatype, the schema detection module 220 may apply a predetermined rule set to data entries from the file. The data processing engine 140 may maintain a dictionary of possible valid date formats. To determine whether data in a field of a file represents a date, the schema detection module 220 compares a sample of data entries from the field of the file against each of the valid date formats in the dictionary. If a match is found, the schema detection module 220 includes the data field as a date datatype in the generated schema. In some embodiments, the schema detection module 220 use a pattern matching machine learning algorithm to identify date data fields. In some embodiments, the date detection is performed on data entries that have formats such as mm-dd-yyy, ddmmmyy, yyy-mm-dd, or other combinations of integers and strings that could be used to represent a date value. If the model determines that the data is stored in a date format, then a date datatype will be indicated in the schema stored for the filetype at the schema metadata store 225. In various embodiments, the schema detection module 220 may also detect other more complex datatypes which may be represented in different ways in different files, such as times or Booleans (i.e., by maintaining dictionaries of possible formats for the other data types).

The formatting module 230 reformats files and normalizes data entries of various datatypes within the files. Aggregation and normalization of data ensures that the files stored in the data lake have a common queryable format. This makes it possible for user to query the data in the same way, irrespective of the original source or the original format of the data. The formatting module 230 uses a normalization ruleset stored in the normalization datastore 235 and schema information stored in the schema metadata store 225 to determine how to reformat a file. In some embodiments, all files stored in the data lake 150 may be normalized according to the same ruleset so that a query for data could apply to any of the files. In other embodiments, the formatting module 230 normalizes data within individual files, such that a single file has standardized datatypes.

For example, if the schema detection module 220 identifies two different date datatypes expressed in one file, the formatting module 230 may reformat all data stored as a date datatype to conform to a standardized date format. In some cases, the data processing engine 140 can receive input identifying a specific normalization ruleset to apply to a file along with the file. In addition to normalizing datatypes, the formatting module 230 may also reformat a file by aggregating fields of the file, for example a normalization ruleset may indicate that redundant or repetitive columns should be deleted by the formatting module 230.

The normalization datastore 235 stores normalization rulesets that the formatting module 230 uses to normalize files. A normalization ruleset describes one or more standardization rules for altering the formatting of datatypes in a file. In some embodiments, different normalization rulesets may be stored for different filetypes or for different file schemas. In some cases, the normalization datastore 235 stores rulesets that can be associated with specific files.

An example normalization ruleset may provide instructions for the formatting module 230 to first check the datatype of a column or field within a file. The formatting module 230 can identify columns and fields of a file by accessing the schema metadata store 225 which associates the file with a schema that describes the file layout and datatypes. If a data column or field stores integer datatypes, the example normalization ruleset may instruct the formatting module 230 to convert any null or empty entries to a '0'. If the data column or filed stores decimal datatypes, the example normalization ruleset may instruct the formatting module 230 to typecast any entry that does not have a decimal to a decimal and to convert any null or empty entries to '0.0'. If a data column or field stores date datatypes, the example normalization ruleset may instruct the formatting module 230 to convert the date to a specific date format, e.g., 'yyy-mm-dd'. If a data column or field stores string datatypes, the example normalization ruleset may instruct the formatting module 230 to check whether the file is associated with any specific predefined rulesets and to convert any null or empty entries to an empty string.

Figure 3:
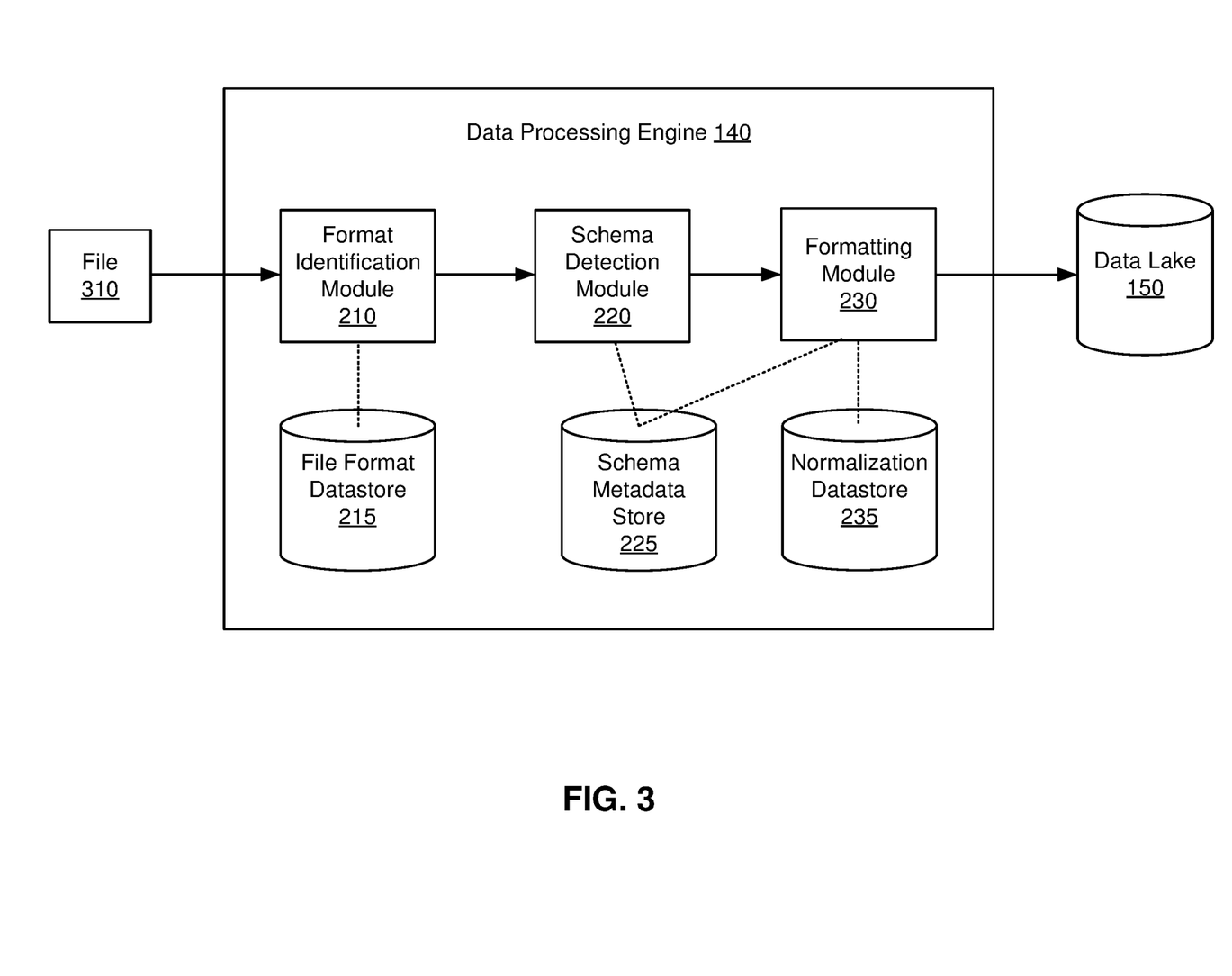
FIG. 3 is a sequence diagram showing a process for processing and normalizing a file for storage, in accordance with an example embodiment.

FIG. 3 is a sequence diagram showing a process for processing and normalizing a file for storage, in accordance with an example embodiment. The data processing engine 140 receives a file 310. The format identification module 210 determines the filetype of the file 310. To determine the filetype of the file 310, the format identification module 210 may access the file format datastore 215 to obtain a ruleset or model to apply to the file or to a sample of the file to determine the filetype.

When the filetype is determined, the file 310 is passed to the schema detection module 220 which analyzes the file 310 to determine the file schema of the file 310, which may include the format of the file 310 and the datatypes stored in the file 310. In one embodiment, the schema detection module 220 accesses the schema metadata store 225 to determine whether an existing schema stored in the schema metadata store 225 matches the schema of the file 310. In some cases, the schema metadata store 225 may already have a schema stored in association with the file 310 or with similar files 310, but with some changes. In such cases, the schema detection module 220 may generate a new schema for the file 310 and store the new schema in association with the file 310. If no schema matching the file is stored in the schema metadata store 225, then the schema detection module 220 detects a schema that describes the file 310 and generates a description of the schema to store in the metadata store 225. Schema detection and determination may be dependent on the determined filetype of the file 310.

Using the determined schema associated with the file 310, the formatting module 230 normalizes and formats the data in the file. Instructions for normalizing and reformatting a file 310 may be stored in the normalization datastore 235. The instructions used to normalize and reformat a file 310 may differ depending on the determined schema of the file 310 or the determined filetype of the file 310. In some embodiments, an input may be provided to the data processing engine 140 along with the file 310 indicating a particular set of normalization and reformatting instructions that should be applied to the file 310 by the formatting module 230. The reformatted and normalized file is stored in the data lake 150.

Figure 4A:
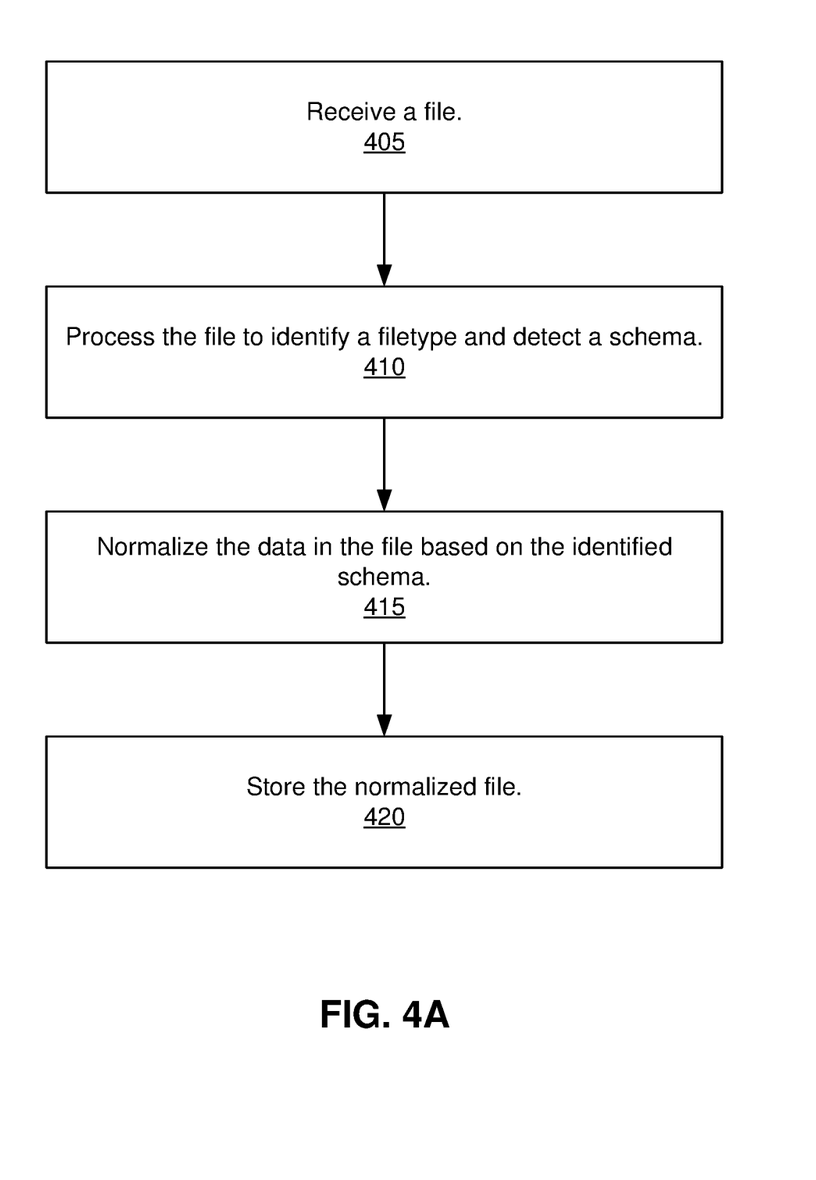
FIG. 4A is a flowchart illustrating a method for processing a file, in accordance with an example embodiment.

FIG. 4A is a flowchart illustrating a method for processing a file, in accordance with an example embodiment. The file processing system 130 receives 405 a file. For example, the file processing system 130 may receive a file from a data provider 115. The file is processed 410 to identify a filetype of the file and to detect a schema of the file. Based on the fields and datatypes indicated by the detected schema of the file, the file processing system 130 normalizes 415 the data in the file. The normalized file is stored 420, for example in a data lake 150.

Figure 4B:
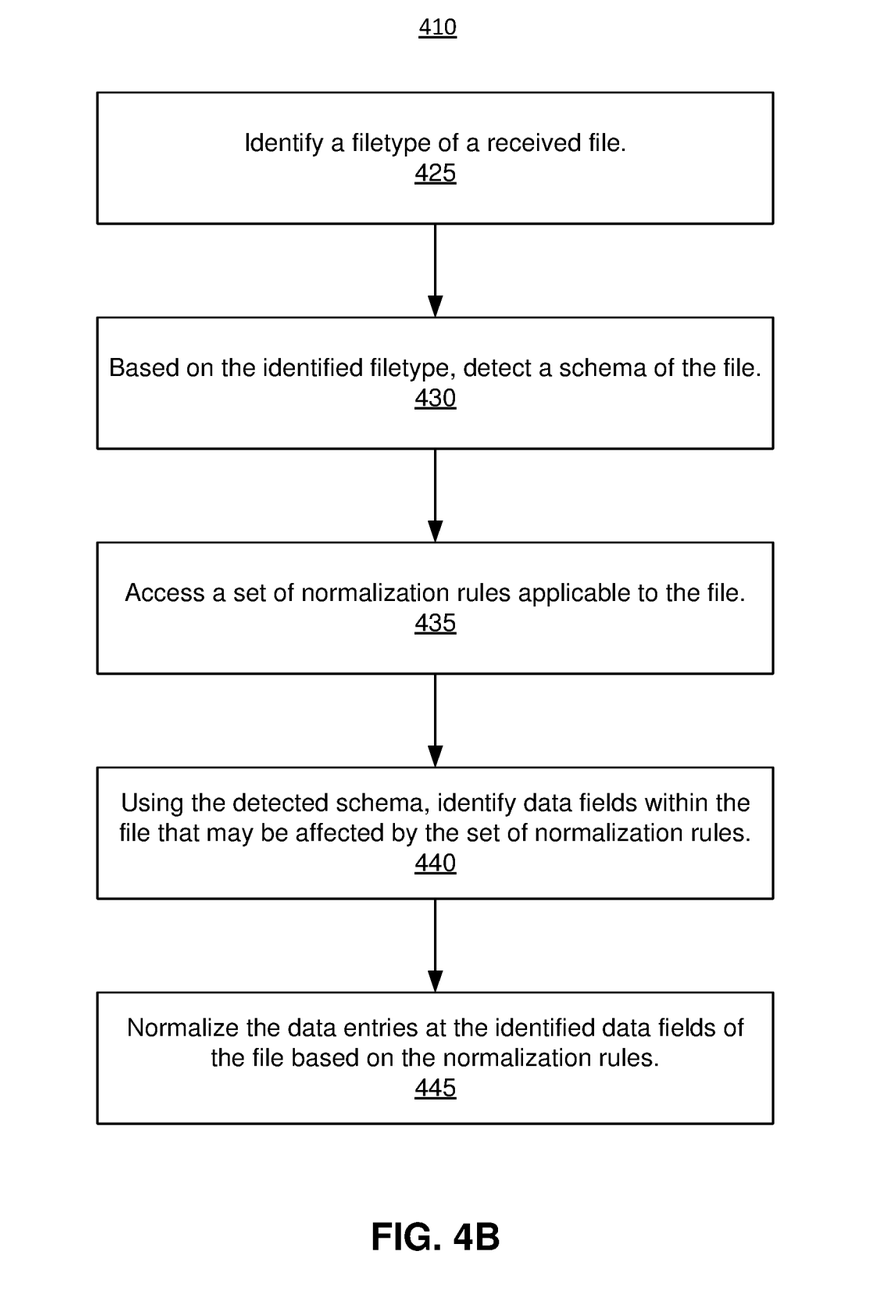
FIG. 4B is a flowchart illustrating a method for normalizing data in a file, in accordance with an example embodiment.

FIG. 4B is a flowchart illustrating a method of the processing step 410 of FIG. 4A, in accordance with an example embodiment. The data processing engine 140 identifies 425 a filetype of a received file. Based on the identified filetype, the data processing engine 140 detects 430 a schema of the file. Detection of a file schema may include matching the file contents to a known file schema stored in the schema metadata store 225, or may include generating a new file schema describing the layout and datatypes in the file. A set of normalization rules applicable to the file are accessed 435. Using the detected schema of the file, the data processing engine 140 identifies 440 data fields (or columns or other sections) within the file that may be affected by the set of normalization rules. The data processing engine 140 normalizes 445 the data entries at the identified data fields of the file based on the normalization rules.

Figure 4C:
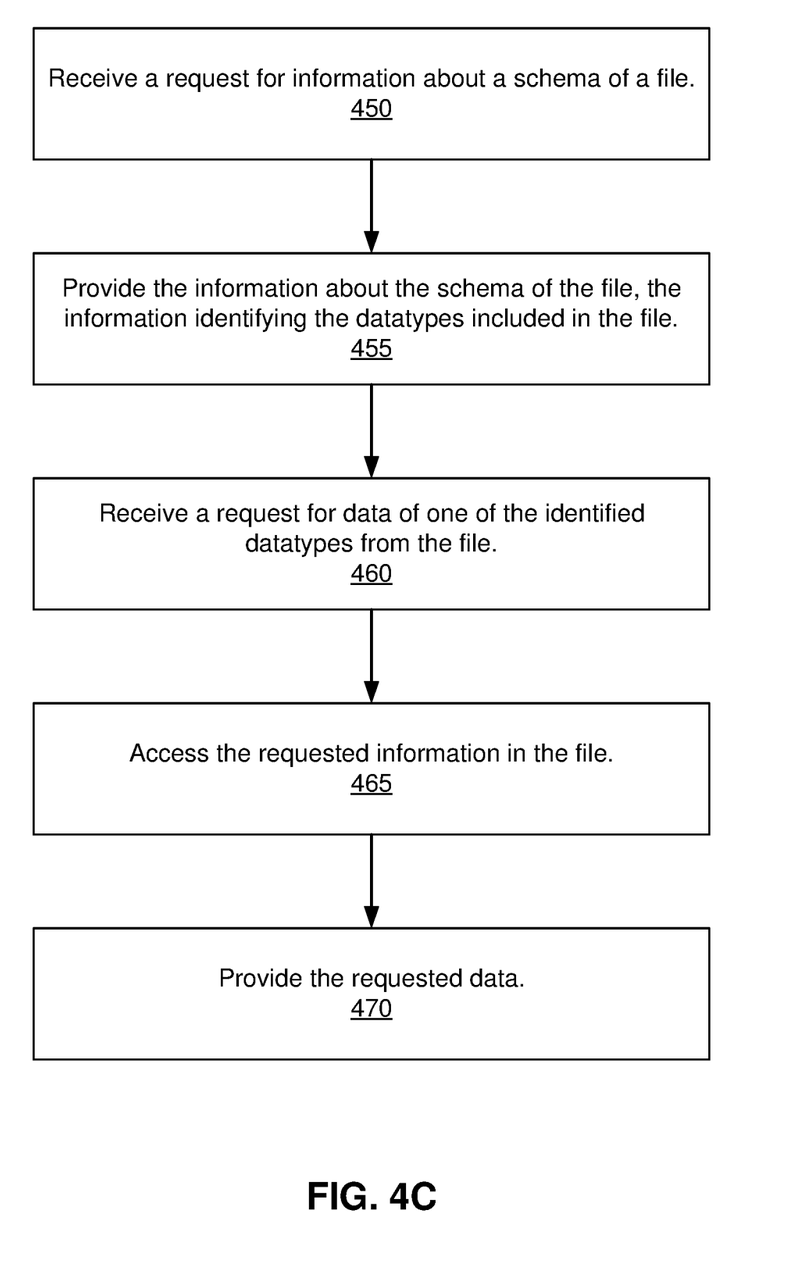
FIG. 4C is a flowchart illustrating a process for providing data from a file, in accordance with an example embodiment.

FIG. 4C is a flowchart illustrating a process for providing data from a file in accordance with an example embodiment. The file processing system 130 receives 450 a request for information about a schema of a file of interest. For example, the file processing system 130 may receive a request about data from a client device 110. In some embodiments, a client device 110 may receive schema information via a browser-based user interface or via an application programming interface (API). The file processing system 130 provides 455 the information about the schema of the file. In some embodiments the information about the schema of the file includes an identification of a set of datatypes that are included in the file schema. In some embodiments, the file processing system 130 may provide schema information about a set of files that may be searched, for example, the system may provide information about all datatypes of data stored among a set of files. A request for data of one or more of the identified datatypes from the file or set of files is received 460. In an example embodiment, the request may be a SQL query. In some embodiments, a request for information may specify a particular file, or may encompass a request to search multiple files, and the response may join data from multiple files to be presented to the client device 110. The file processing system 130 accesses 465 the requested information in the file or set of files, and provides 470 the requested data to the requesting client device 110.

Figure 5:
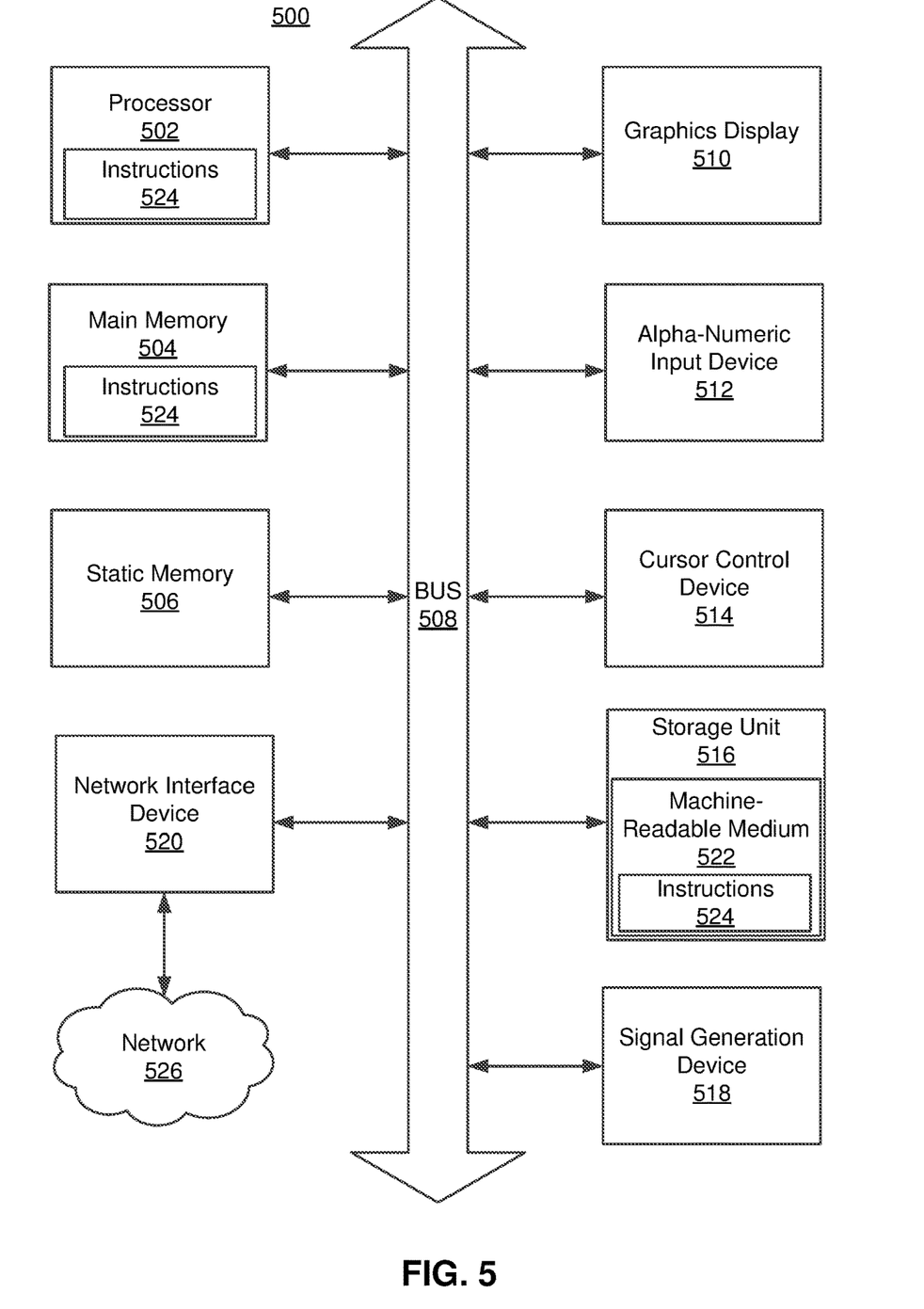
FIG. 5 is a block diagram illustrating components of an example machine able to read instructions from a machine-readable medium and execute them in one or more processors.

FIG. 5 is a block diagram illustrating components of an example machine able to read instructions from a machine-readable medium and execute them in one or more processors (or controllers). Specifically, FIG. 5 shows a diagrammatic representation of the file processing system 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include instructions for implementing the functionalities of the format identification module 210, the schema detection module 220, and the formatting module 230. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method of a system for normalizing data in a file comprising:
   receiving a file for storage at the system;
   sampling contents of the file;
   testing the sample using a plurality of file format rulesets that are each associated with a different file type, each of the plurality of file format rulesets including one or more indicators that indicate the filetype corresponding to the file format ruleset;
   determining a filetype of the file based on the sample including at least one of the one or more indicators included in one of the plurality of file format rulesets;
   detecting a schema for the file based on the determined filetype of the file, the schema describing a file structure of the file;
   accessing a set of normalization rules that are applicable to the file, the set of normalization rules describing one or more actions to apply to one or more types of data fields included in the file;
   identifying, using the detected schema for the file, a set of data fields within the file that match the one or more types of data fields described in the set of normalization rules;
   reformatting data stored at the identified set of data fields within the file based on the normalization rules from the set of normalization rules that apply to data of the datatypes that are stored in the data fields;
   storing the file including the reformatted data in a data lake of the system;
   receiving a request for data from the reformatted file from a client device;
   accessing the file in the data lake to obtain the requested data from the file; and
   providing the requested data from the accessed file to the client device.

2. The computer-implemented method of claim 1, wherein detecting a schema for the file based on the determined filetype of the file comprises:
   determining that a schema matching the file is not already stored at a schema repository;
   sampling contents of the file;
   generating a schema that describes fields and datatypes in the file; and
   storing the generated schema in the schema repository.

3. The computer-implemented method of claim 1, wherein detecting a schema for the file based on the determined filetype of the file comprises:
   determining that a schema associated with the determined filetype of the file is already stored at a schema repository;
   sampling contents of the file;
   comparing the file sample to the schema associated with the determined filetype of the file;
   responsive to a determination that the schema associated with the determined filetype of the file does not match a schema of the file sample, generating an updated schema that describes the fields and datatypes in the file; and
   storing the updated schema in association with the filetype of the file at the schema repository.

4. The computer-implemented method of claim 1, wherein detecting a schema for the file based on the determined filetype of the file comprises:
   sampling contents of the file;
   comparing the file sample to a set of schemas associated with the identified filetype of the file stored in a schema repository; and
   identifying a schema from the set of schemas in the schema repository that describes fields and datatypes of the file.

5. The computer-implemented method of claim 1, further comprising:
   sampling contents of the file;
   determining using a pattern matching computer model that is trained to determine whether a data field stores dates, that a data field of the file stores dates; and
   storing information about the date data field of the file as a part of the schema describing a file structure of the file;
   wherein reformatting data stored at the identified set of data fields within the file based on the normalization rules from the set of normalization rules includes reformatting the data at the data field of the file that stores dates.

6. The computer-implemented method of claim 1, further comprising:
   providing, to a client device, information about the schema associated with the file from which information is requested, the information about the schema including a set of datatypes that are included in the file.

7. A computer system for normalizing data in a file comprising:
   one or more computer processors for executing computer program instructions; and
   a non-transitory computer-readable storage medium storing instructions executable by the one or more computer processors to perform steps comprising:
      receiving a file for storage at the system;
      sampling contents of the file;
      testing the sample using a plurality of file format rulesets that are each associated with a different file type, each of the plurality of file format rulesets including one or more indicators that indicate the filetype corresponding to the file format ruleset;
      determining a filetype of the file based on the sample including at least one of the one or more indicators included in one of the plurality of file format rulesets;
      detecting a schema for the file based on the determined filetype of the file, the schema describing a file structure of the file;
      accessing a set of normalization rules that are applicable to the file, the set of normalization rules describing one or more actions to apply to one or more types of data fields included in the file;
      identifying, using the detected schema for the file, a set of data fields within the file that match the one or more types of data fields described in the set of normalization rules;
      reformatting data stored at the identified set of data fields within the file based on the normalization rules from the set of normalization rules that apply to data of the datatypes that are stored in the data fields;
      storing the file including the reformatted data in a data lake of the system;
      receiving a request for data from the reformatted file from a client device;
      accessing the file in the data lake to obtain the requested data from the file; and
      providing the requested data from the accessed file to the client device.

8. The computer system of claim 7, wherein detecting a schema for the file based on the determined filetype of the file comprises:
   determining that a schema matching the file is not already stored at a schema repository;
   sampling contents of the file;
   generating a schema that describes fields and datatypes in the file; and
   storing the generated schema in the schema repository.

9. The computer system of claim 7, wherein detecting a schema for the file based on the determined filetype of the file comprises:
   determining that a schema associated with the determined filetype of the file is already stored at a schema repository;
   sampling contents of the file;
   comparing the file sample to the schema associated with the filetype of the file;
   responsive to a determination that the schema associated with the determined filetype of the file does not match a schema of the file sample, generating an updated schema that describes the fields and datatypes in the file; and
   storing the updated schema in association with the filetype of the file at the schema repository.

10. The computer system of claim 7, wherein detecting a schema for the file based on the determined filetype of the file comprises:
    sampling contents of the file;
    comparing the file sample to a set of schemas associated with the identified filetype of the file stored in a schema repository; and
    identifying a schema from the set of schemas in the schema repository that describes fields and datatypes of the file.

11. The computer system of claim 7, the steps further comprising:
    sampling contents of the file;
    determining using a pattern matching computer model that is trained to determine whether a data field stores dates, that a data field of the file stores dates; and storing information about the date data field of the file as a part of the schema describing a file structure of the file;

wherein reformatting data stored at the identified set of data fields within the file based on the normalization rules from the set of normalization rules includes reformatting the data at the data field of the file that stores dates.

12. The computer system of claim 7, the steps further comprising:

providing, to a client device, information about the schema associated with the file from which information is requested, the information about the schema including a set of datatypes that are included in the file.

13. A computer-implemented method of a system for normalizing data in files, the method comprising:

receiving a plurality of files for storage at the system, each of the plurality of files associated with a different filetype;

determining the filetype for each file in the plurality of files by:

sampling contents of the file;

testing the sample using a plurality of file format rulesets that are each associated with a different file type, each of the plurality of file format rulesets including one or more indicators that indicate the filetype corresponding to the file format ruleset; and determining a filetype of the file based on the sample including at least one of the one or more indicators included in one of the plurality of file format rulesets;

accessing a set of normalization rules that describe one or more actions to apply to one or more types of data fields;

identifying, based on the determined filetype of each of the plurality of files, data fields within the plurality of files that match the one or more types of data fields described in the set of normalization rules;

normalizing values of the identified data fields included in the plurality of files to have a common format according to the one or more actions described in the set of normalization rules;

storing the plurality of files comprising the normalized values in a data lake;

receiving a query from a client device for data from a file from the stored plurality of files;

accessing the data included in the queried file from the data lake; and providing the accessed data from the file to the client device.

14. The computer-implemented method of claim 13, wherein normalizing values of the identified data fields included in the plurality of files comprises:

normalizing values of a set of the identified data fields that store the values as dates to have a common format for representing the dates.

15. The computer-implemented method of claim 13, wherein identifying data fields within the plurality of files that match the one or more types of data fields described in the set of normalization rules comprises:

determining a set of data fields within the plurality of files that include values stored as date datatypes, the determination including applying a pattern matching computer model that is trained to determine whether a data field stores dates to a plurality of the data fields within the plurality of files.

16. The computer-implemented method of claim 13, wherein identifying data fields within a file of the plurality of files comprises detecting a schema for the file based on a determined filetype of the file, the schema describing a file structure of the file and datatypes included in the file.

17. The computer-implemented method of claim 11, wherein normalizing values of the identified data fields in a file of the plurality of files comprises:

accessing a set of normalization rules that are applicable to the file, the set of normalization rules describing one or more actions to apply to one or more types of data fields included in the file; and reformatting values stored at data fields included in the file based on the normalization rules from the set of normalization rules that apply to the data fields included in the file.

* * * * *